US012607124B2

(12) United States Patent
Dubosc et al.

(10) Patent No.: US 12,607,124 B2
(45) Date of Patent: Apr. 21, 2026

(54) AERONAUTICAL PROPULSION SYSTEM COMPRISING AN OPTIMIZED FAN SECTION

(71) Applicant: SAFRAN AIRCRAFT ENGINES, Paris (FR)

(72) Inventors: Matthieu Pierre Michel Dubosc, Moissy-Cramayel (FR); Guillaume Olivier Vartan Martin, Moissy-Cramayel (FR); Didier René André Escure, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/424,121

(22) Filed: Jan. 26, 2024

(65) Prior Publication Data

US 2025/0243760 A1 Jul. 31, 2025

(30) Foreign Application Priority Data

Jan. 26, 2023 (FR) ....................................... 2300739

(51) Int. Cl.
*F01D 5/00* (2006.01)
*F01D 1/04* (2006.01)
*F01D 25/00* (2006.01)

(52) U.S. Cl.
CPC ................. *F01D 5/00* (2013.01); *F01D 1/04* (2013.01); *F01D 25/00* (2013.01); *F05D 2220/36* (2013.01)

(58) Field of Classification Search
CPC ..................................... F01D 1/04; F01D 5/00
See application file for complete search history.

(56) References Cited

U.S. PATENT DOCUMENTS

| | | | | |
|---|---|---|---|---|
| 9,862,497 | B2 * | 1/2018 | Ewens | B64D 27/40 |
| 10,458,426 | B2 * | 10/2019 | Wilkin, II | F04D 29/325 |
| 10,526,894 | B1 * | 1/2020 | Rose | F04D 29/544 |
| 12,012,898 | B2 * | 6/2024 | Miller | F02K 3/06 |
| 2013/0011266 | A1 | 1/2013 | Gallagher et al. | |
| 2021/0381431 | A1 * | 12/2021 | Kupratis | F02K 3/077 |
| 2022/0259985 | A1 | 8/2022 | DePuy et al. | |
| 2025/0243760 | A1 * | 7/2025 | Dubosc | F01D 1/04 |

OTHER PUBLICATIONS

D.P. Edkins et al., "NASA CR-120914 TF34 Turbofan Quiet Engine Study Final Report", Jan. 1, 1972, pp. 1-99.
William S. Willis, Quiet Clean Short-Haul Experimental Engine (QCSEE) Final Report, NASA CR-159473, Aug. 31, 1979, pp. 1-312.
French Search Report for FR 2300739 dated Aug. 23, 2023.

* cited by examiner

*Primary Examiner* — Christopher R Legendre
(74) *Attorney, Agent, or Firm* — Sughrue Mion, PLLC

(57) ABSTRACT

A fan section of an aeronautical propulsion system includes a fan rotor including seventeen blades to twenty blades and having a solidity strictly less than 1.0. The solidity is equal to a ratio between a chord at the blade tip and an inter-blade pitch at the blade tip. The fan section has a hub-tip ratio greater than or equal to 0.22 and less than or equal to 0.32, a pressure ratio greater than or equal to 1.05 and less than or equal to 1.5, and a peripheral speed at the blade tip greater than or equal to 260 m/s and less than or equal to 400 m/s. The pressure ratio and the peripheral speed are measured at cruising speed.

16 Claims, 6 Drawing Sheets

AERONAUTICAL PROPULSION SYSTEM COMPRISING AN OPTIMIZED FAN SECTION

CROSS-REFERENCE TO RELATED APPLICATION

This Application claims priority to French Application No. 2300739, filed Jan. 26, 2023, in the French Patent Office, the contents of which being herein incorporated by reference in its entirety.

TECHNICAL FIELD

The present application generally concerns the field of propulsion systems, and more particularly aeronautical propulsion systems having a high, or even very high, bypass ratio.

BACKGROUND

A propulsion system generally includes, from upstream to downstream in the gas flow direction, a fan section, a compressor section which can comprise a low-pressure compressor and a high-pressure compressor, a combustion chamber and a turbine section which can comprise in particular a high-pressure turbine and a low-pressure turbine. The high-pressure compressor is driven in rotation by the high-pressure turbine via a high-pressure shaft. The fan and, where applicable, the low-pressure compressor are driven in rotation by the low-pressure turbine via a low-pressure shaft.

The technological research efforts have already made it possible to very significantly improve the environmental performance of the aircrafts. The Applicant takes into account the impacting factors in all phases of design and development to obtain aeronautical components and products that are less energy-efficient, more respectful of the environment and whose integration and use in civil aviation have moderate environmental consequences with the aim of improving the energy efficiency of the aircrafts.

Thus, in order to improve the propulsive efficiency of the propulsion system and to reduce its specific consumption as well as the noise emitted by the fan section, propulsion systems have been proposed having a high BPR bypass ratio (corresponding to the ratio between the flow rate of the secondary air stream and the flow rate of the primary air stream). To achieve such bypass ratios, the fan section can be decoupled from the low-pressure turbine, thus making it possible to independently optimize their respective rotational speed. Generally, the decoupling is achieved using a reduction mechanism placed between the upstream end of the low-pressure shaft and a rotor of the fan section. The rotor of the fan section is then driven by the low-pressure shaft via the reduction mechanism at a rotational speed lower than that of the low-pressure shaft.

The improvement of the propulsive efficiency of the system can also involve the dimensioning of the fan section. Indeed, due to its large diameter (in particular in order to reach high bypass ratios and low fan pressure ratios), the fan section represents an important portion of the propulsion system in terms of mass and therefore of specific consumption. At the same time, the fan section produces a very large portion of the thrust of the propulsion system.

DISCLOSURE

One aim of the present application is to optimize the fan section of the propulsion system in order to make it more efficient without excessively penalizing the mass and therefore the specific consumption of the propulsion system.

For this purpose, according to a first aspect, a fan section of an aeronautical propulsion system is proposed, the fan section comprising a fan rotor comprising at least seventeen blades and at most twenty blades and having a solidity strictly less than 1.0, where the solidity is equal to a ratio between a chord at the blade tip and an inter-blade pitch at the blade tip, the fan section having:

- a pressure ratio greater than or equal to 1.05 and less than or equal to 1.5; and
- a peripheral speed at the blade tip greater than or equal to 260 m/s and 400 m/s;
- the pressure ratio and the peripheral speed being measured at cruising speed.

Some preferred but non-limiting characteristics of the fan section according to the first aspect are as follows, taken individually or in combination:

- the solidity of the fan rotor is strictly greater than 0.6;
- a diameter of the fan rotor is greater than or equal to 127 cm and less than or equal to 304.8 cm, for example greater than or equal to 215.9 cm and less than or equal to 304.8 cm, for example of the order of 228.6 cm;
- the peripheral speed at the tip of the blades is greater than or equal to 270 m/s and less than or equal to 380 m/s;
- the fan section has a hub-tip ratio greater than or equal to 0.22 and less than or equal to 0.32, for example greater than or equal to 0.235 and less than or equal to 0.30, for example less than or equal to 0.27;
- the fan section is housed in a fan casing, the blades of the fan rotor being fixed in rotation relative to a hub of the fan rotor so as to have a fixed pitch; and/or
- the fan section further comprises a fan stator comprising at least 38 stator vanes and at most 48 stator vanes, for example exactly 40 stator vanes.

According to a second aspect, an aeronautical propulsion system is proposed comprising:

- a drive shaft movable in rotation about an axis of rotation;
- a fan shaft;
- a fan section according to the first aspect, the fan rotor being driven in rotation by the fan shaft; and
- a reduction mechanism coupling the drive shaft and the fan shaft in order to drive the fan shaft at a rotational speed lower than the rotational speed of the drive shaft.

Some preferred but non-limiting characteristics of the aeronautical propulsion system according to the second aspect are as follows, taken individually or in combination:

- a thrust density per fan rotor blade of the fan section is greater than or equal to $0.5\times10^4$ and less than or equal to $3.0\times10^4$ N/m$^2$, where the thrust density per blade is defined by the following formula:

$$\text{Thrust density} = \frac{FN}{n * D^2} * 100$$

and where: FN is the thrust generated by the propulsion system and is measured when the propulsion system is stationary system is stationary at cruising speed in a standard atmosphere and is expressed in Newton; n is the number of blades in the fan rotor and is at least equal to seventeen blades and at most equal to twenty blades; and D is the diameter of the fan rotor, measured in a plane normal to the axis of rotation at an intersection between the top and a leading edge of the fan rotor blades, and is expressed in meters; and/or a bypass ratio of the propulsion system is greater than or equal to 10, for example comprised between 10 and 35 inclusive, for example between 10 and 18 inclusive;

a drive turbine comprises at least three and at most five stages;

a compressor comprises at least two and at most four stages;

the propulsion system further comprises a high-pressure turbine and a high-pressure compressor connected via a high-pressure shaft, the high-pressure shaft rotating more quickly than the drive shaft, the high-pressure turbine being a two-stage turbine; and/or the high-pressure compressor comprises at least eight and at most eleven stages.

According to a third aspect, an aircraft is proposed comprising at least one propulsion system according to the second aspect fixed to the aircraft via a mast.

According to a fourth aspect, a method for dimensioning or manufacturing a fan section of an aeronautical propulsion system is proposed, the fan section comprising a fan rotor comprising at least seventeen blades and at most twenty blades and having a solidity strictly less than 1.0 and optionally strictly greater than 0.6, where the solidity is equal to a ratio between a chord at the blade tip and an inter-blade pitch at the blade tip, the fan section having:

a pressure ratio greater than or equal to 1.05 and less than or equal to 1.5; and a peripheral speed at the blade tip greater than or equal to 260 m/s and 400 m/s;

the pressure ratio and the peripheral speed being measured at cruising speed.

$$\text{Thrust density} = \frac{FN}{n * D^2} * 100$$

Some preferred but non-limiting characteristics of the dimensioning or manufacturing method according to the fourth aspect are as follows, taken individually or in combination:

$$\text{Thrust density} = \frac{FN}{n * D^2} * 100$$

the fan section is further dimensioned so that a thrust density per fan rotor blade of the propulsion system is greater than or equal to $0.5\times10^4$ and less than or equal to $3.0\times10^4$ N/m$^2$ where the thrust density per fan rotor blade is defined by the following formula:

$$\text{Thrust density} = \frac{FN}{n * D^2} * 100$$

$$\text{Thrust density} = \frac{FN}{n * D^2} * 100$$

and where: FN is the thrust generated by the propulsion system and is measured when the propulsion system is stationary at cruising speed and is expressed in Newton; n is the number of blades in the fan rotor and is at least equal to seventeen blades and at most equal to twenty blades; and D is the fan diameter, measured in a plane normal to the axis of rotation at an intersection between the top and a leading edge of the fan rotor blades, and is expressed in meters.

$$\text{Thrust density} = \frac{FN}{n * D^2} * 100$$

DESCRIPTION OF THE FIGURES

Other characteristics, aims and advantages of the present disclosure will emerge from the following description, which is purely illustrative and not limiting, and which should be read in relation to the appended drawings in which.

In all the figures, similar elements bear identical references.

DETAILED DESCRIPTION

Figure 1:
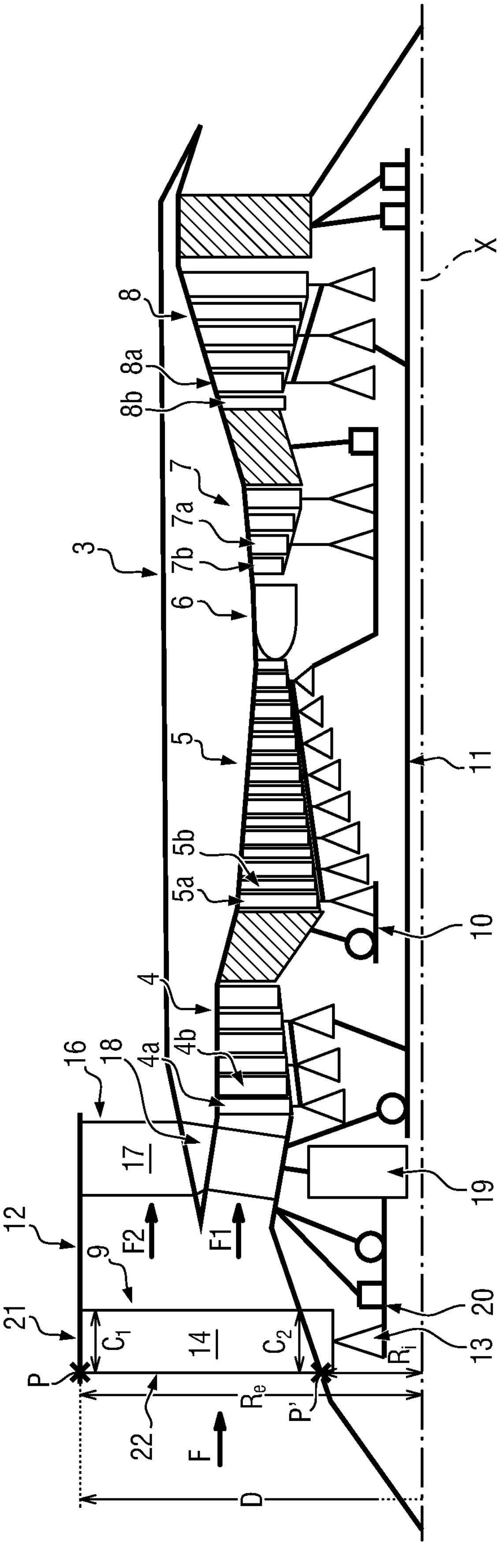
FIG. 1 is a schematic, partial and sectional view of one example of a propulsion system in accordance with a first embodiment.

A propulsion system 1 has a main direction extending along a longitudinal axis X and comprises, from upstream to downstream in the gas flow direction in the propulsion system 1 when in operation, a fan section 2 and a primary spool 3, often called "gas generator", including a compressor section 4, 5, a combustion chamber 6 and a turbine section 7, 8. The propulsion system 1 is here an aeronautical propulsion system 1 configured to be fixed on an aircraft 100 via a pylon (or mast).

The compressor section 4, 5 comprises a succession of stages each comprising a blade wheel (rotor) 4*a*, 5*a* rotating in front of a vane wheel (stator) 4*b*, 5*b*. The turbine section 7, 8 also comprises a succession of stages each comprising a vane wheel (stator) 7*b*, 8*b* behind which a blade wheel (rotor) 7*a*, 8*a* rotates.

In the present application, the axial direction corresponds to the direction of the longitudinal axis X, in correspondence with the rotation of the shafts of the gas generator, and a radial direction is a direction perpendicular to this axis X and passing therethrough. Moreover, the circumferential (or lateral, or tangential) direction corresponds to a direction perpendicular to the longitudinal axis X and not passing therethrough. Unless otherwise specified, inner (respectively, internal) and outer (respectively, external), respectively, are used with reference to a radial direction so that the inner portion or face of an element is closer to the axis X than the outer portion or face of the same element.

In operation, an air stream F entering the propulsion system 1 is divided between a primary air stream F1 and a secondary air stream F2, which circulate from upstream to downstream in the propulsion system 1.

The secondary air stream F2 (also called "bypass air stream") flows around the primary spool 3. The secondary air stream F2 allows cooling the periphery of the primary spool 3 and serves to generate most of the thrust provided by the propulsion system 1.

The primary air stream F1 flows in a primary flowpath inside the primary spool 3, successively passing through the compressor section 4, 5, the combustion chamber 6 where it is mixed with fuel to serve as oxidizer, and the turbine section 7, 8. The passage of the primary air stream F1 through the turbine section 7, 8 receiving energy from the combustion chamber 6 causes a rotation of the rotor of the turbine section 7, 8, which in turn drives in rotation the rotor of the compressor section 4, 5 as well as a rotor portion 9 of the fan section 2.

In a two-spool propulsion system 1, the compressor section 4, 5 can comprise a low-pressure compressor 4 and a high-pressure compressor 5. The turbine section 7, 8 can comprise a high-pressure turbine 7 and a low-pressure turbine 8. The rotor of the high-pressure compressor 5 is driven in rotation by the rotor of the high-pressure turbine 7 via a high-pressure shaft 10. The rotor of the low-pressure compressor 4 and the rotor portion 9 of the fan section 2 are driven in rotation by the rotor of the low-pressure turbine 8 via a low-pressure shaft 11. Thus, the primary spool 3 comprises a high-pressure spool comprising the high-pressure compressor 5, the high-pressure turbine 7 and the high-pressure shaft 10, and a low-pressure spool comprising the fan section 2, the low-pressure compressor 4, the low-pressure turbine 8 and the low-pressure shaft 11. The rotational speed of the high-pressure spool is greater than the rotational speed of the low-pressure spool. In a triple-spool propulsion system 1, the turbine section 7, 8 further comprises an intermediate turbine, positioned between the high-pressure turbine 7 and the low-pressure turbine 8 and configured to drive the rotor of the low-pressure compressor 4 via an intermediate shaft. The fan rotor 9 and the rotor of the high-pressure compressor 5 remain driven by the low-pressure shaft 11 and the high-pressure shaft 10, respectively.

The low-pressure shaft 11 is generally housed, over a section of its length, in the high-pressure shaft 10 and is coaxial with the high-pressure shaft 10. The low-pressure shaft 11 and the high-pressure shaft 10 can be co-rotating, that is to say driven in the same direction about the longitudinal axis X. As a variant, the low-pressure shaft 11 and the high-pressure shaft are counter-rotating, that is to say driven in opposite directions about the longitudinal axis X. Where applicable, the intermediate shaft is housed between the high-pressure shaft 10 and the low-pressure shaft 11. The intermediate shaft and the low-pressure shaft 11 can be co-rotating or counter-rotating.

The fan section 2 comprises at least the fan rotor 9 capable of being driven in rotation relative to a stator portion of the propulsion system 1 by the turbine section 7, 8. Each fan rotor 9 comprises a hub 13 and blades 14 extending radially from the hub 13. The blades 14 of each rotor 9 can be fixed relative to the hub 13.

The fan section 2 can further comprise a fan stator 16, or straightener, which comprises vanes 17 mounted on a hub of the fan stator 16 and have the function of straightening the secondary air stream F2 which flows at the outlet of the fan rotor 9. The vanes 17 of the fan stator 18 can be fixed relative to the hub or have variable pitch angle.

In order to improve the propulsive efficiency of the propulsion system 1 and to reduce its specific consumption as well as the noise emitted by the fan section 2, the propulsion system 1 has a high bypass ratio. By "high bypass ratio", it is meant here a bypass ratio greater than or equal to 10, for example comprised between 10 and 80 inclusive. To calculate the bypass ratio, the mass flow rate of the secondary air stream F2 and the mass flow rate of the primary air stream F1 are measured when the propulsion system 1 is stationary, uninstalled, in take-off rating in a standard atmosphere (as defined by the International Civil Aviation Organization (ICAO) Manual, Doc 7488/3, 3$^{rd}$ edition) and at sea level (conditions known as SLS, for Sea Level Standard). By "uninstalled", it is meant here that the measurements are performed when the propulsion system 1 is in a test bench (and uninstalled on an aircraft 100), the measurements then being simpler to perform.

It will be noted that, in the present application, some parameters are determined in cruising conditions that is to say at 10,668 m altitude (35,000 feet), 0.8 Mach and in ISA (International Standard Atmosphere) conditions defined by the standard ISO2533/edition 1975/addendum 1985. In addition, the distances (length, radius, diameter, etc.) are measured at ambient temperature (approximately 20° C.) when the propulsion system 1 is cold, that is to say when the propulsion system 1 is stopped for a sufficient period for the parts of the propulsion system to be at ambient temperature, it being understood that these dimensions vary little compared to the conditions in which the propulsion system 1 is in take-off rating.

The fan rotor 9 is decoupled from the low-pressure shaft 11 using a reduction mechanism 19, placed between an upstream end of the low-pressure shaft 11 and the fan rotor 9, in order to independently optimize their respective rotational speed. In this case, the propulsion system 1 further comprises an additional shaft, called "fan shaft" 20. The low-pressure shaft 11 connects the low-pressure turbine 8 to an inlet of the reduction mechanism 19 while the fan shaft 20 connects the outlet of the reduction mechanism 19 to the fan rotor 9. The fan rotor 9 is therefore driven by the low-pressure shaft 11 via the reduction mechanism 19 and the fan shaft 20 at a rotational speed lower than the rotational speed of the low-pressure turbine 8.

This decoupling makes it possible to reduce the rotational speed and the pressure ratio of the fan rotor 9 and to increase the power extracted by the low-pressure turbine 8. Indeed, the overall efficiency of the propulsion systems is conditioned to the first order by the propulsive efficiency, which is favorably influenced by a minimization of the variation in kinetic energy of the air when crossing the propulsion system 1. In a high bypass ratio propulsion system 1, most of the flow rate generating the propulsive force is constituted by the secondary air stream F2 of the propulsion system 1, the kinetic energy of the secondary air stream F2 being mainly affected by the compression that the secondary air stream F2 undergoes when crossing the fan section 2. The propulsive efficiency and the pressure ratio of the fan section 2 are therefore linked:the lower the pressure ratio of the fan section 2, the better the propulsive efficiency.

The propulsion system 1 is configured to provide a thrust comprised between 18,000 lbf (80,068 N) and 51,000 lbf (222,411 N), for example between 20,000 lbf (88,964 N) and 35,000 lbf (155,688 N), when the propulsion system 1 is stationary, uninstalled, in take-off rating in a standard atmosphere (as defined by the International Civil Aviation Organization (ICAO) Manual, Doc 7488/3, $3^{rd}$ edition) and at sea level.

The fan section 2 can comprise a fan casing 12, the fan rotor 9 being housed in the fan casing 12.

The fan rotor 9 extends upstream of a fan stator. The vanes 17 of the fan stator 16 are then generally called Outlet Guide Vane (or OGV) and have a fixed pitch angle relative to the hub of the fan stator. Moreover, the bypass ratio of the propulsion system 1 is for example greater than or equal to 10, for example comprised between 10 and 35 inclusive, for example between 10 and 18 inclusive.

Figure 2A:
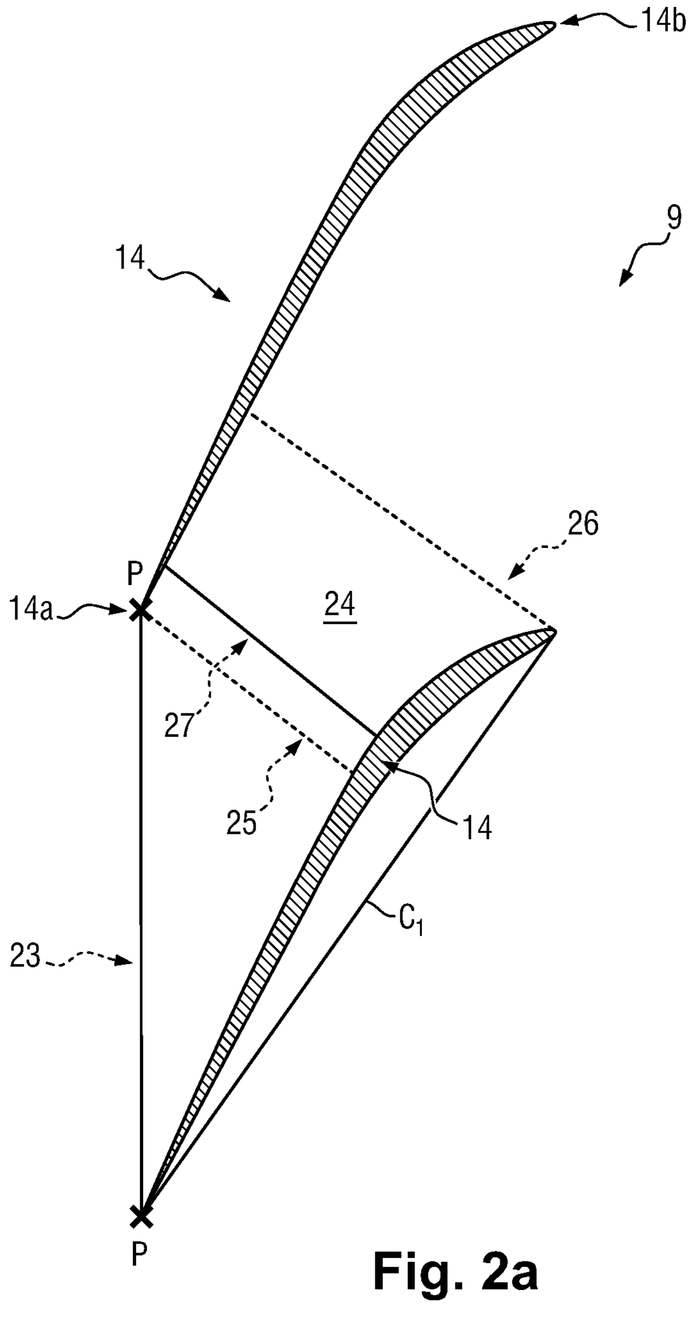
FIG. 2*a* is a partial and schematic sectional view of one example of a fan rotor of a propulsion system in accordance with one embodiment, the section being made in a plane passing through an upstream intersection point between a top and a leading edge of two adjacent blades.
Figure 2B:
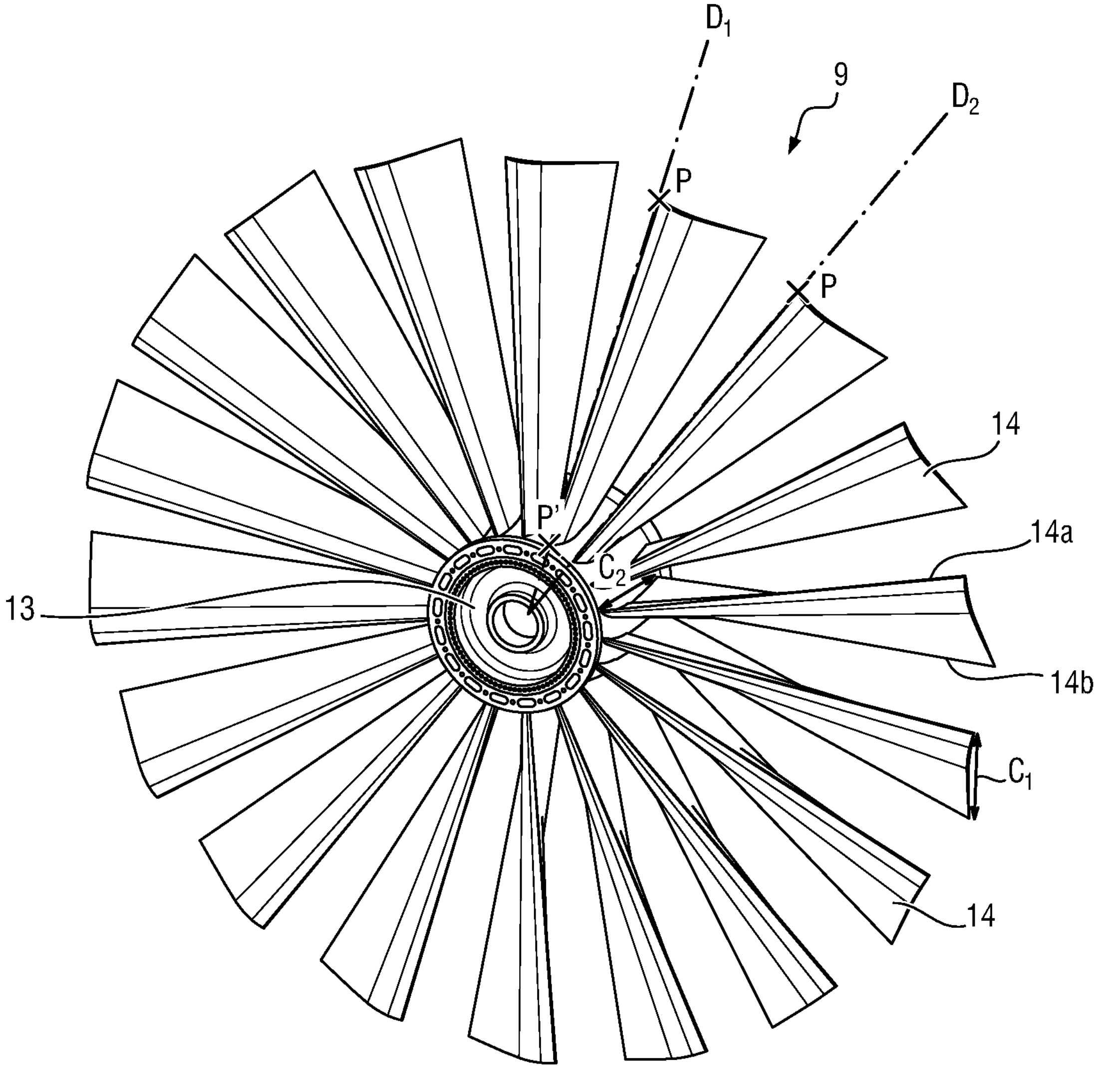
FIG. 2*b* is a perspective view of one example of a fan rotor of a propulsion system in accordance with one embodiment.

Each fan blade 14 has a leading edge 14*a* and a trailing edge 14*b* (see for example FIGS. 2*a* and 2*b*). The leading edge 14*a* is configured to extend facing the flow of gases entering the fan rotor 9. It corresponds to the anterior portion of an aerodynamic profile which faces the air stream and which divides the air flow into an intrados flow and an extrados flow. The trailing edge 28*b* corresponds to the posterior portion of the aerodynamic profile, where the intrados and extrados flows meet. It is noted here that, when the blades 14 comprise a leading edge and/or trailing edge shield, the leading edge 14*a* (respectively the trailing edge 14*b*) of the blades 14 corresponds to the anterior portion of the profile of the shield which reconstitutes the leading edge (respectively the posterior portion of the profile of the shield which reconstitutes the trailing edge 14*b*) and whose function is to divide the flow into an intrados flow and an extrados flow (respectively to join the flows).

The fan rotor 9 moreover comprises a series of platforms each extending between two adjacent blades 14 and configured to delimit radially inside the air stream F passing through the rotor 9.

The fan blade 14 further has a chord at the blade tip $c_1$ and a chord at the blade base $c_2$.

The chord at the blade tip $c_1$ corresponds to the straight line segment which connects an upstream intersection point P between the leading edge 14*a* and the top 21 of a blade 14 and a downstream intersection point between the trailing edge 14*b* and the top 21 of the blade 14.

The chord at the blade base $c_2$ corresponds to the straight line segment parallel to the axis of rotation X which connects a second downstream intersection point between the trailing edge 14*b* and the surface that delimits radially inside the flowpath in the fan rotor 9 (and corresponds to the connection point of the trailing edge 14*b* with the aerodynamic surface of a platform of the fan rotor 9) and a second upstream intersection point P between the leading edge 14*a* and a plane circumferential to the axis X which comprises the second downstream intersection point. The second upstream and downstream intersection points are therefore at an iso-distance from the axis X (same radius). The second upstream intersection point P moreover extends at a distance from the aerodynamic surface of the platform, as can be seen from FIG. 1 given as a purely illustrative example.

Figure 3:
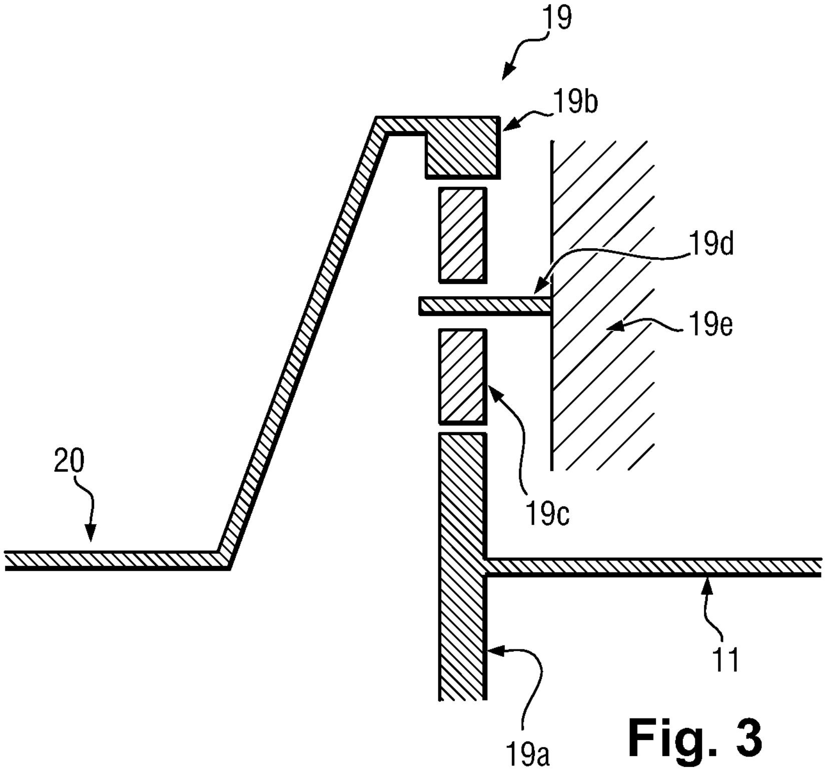
FIG. 3 is a schematic sectional view of one example of a reduction mechanism according to a first variant.
Figure 4:
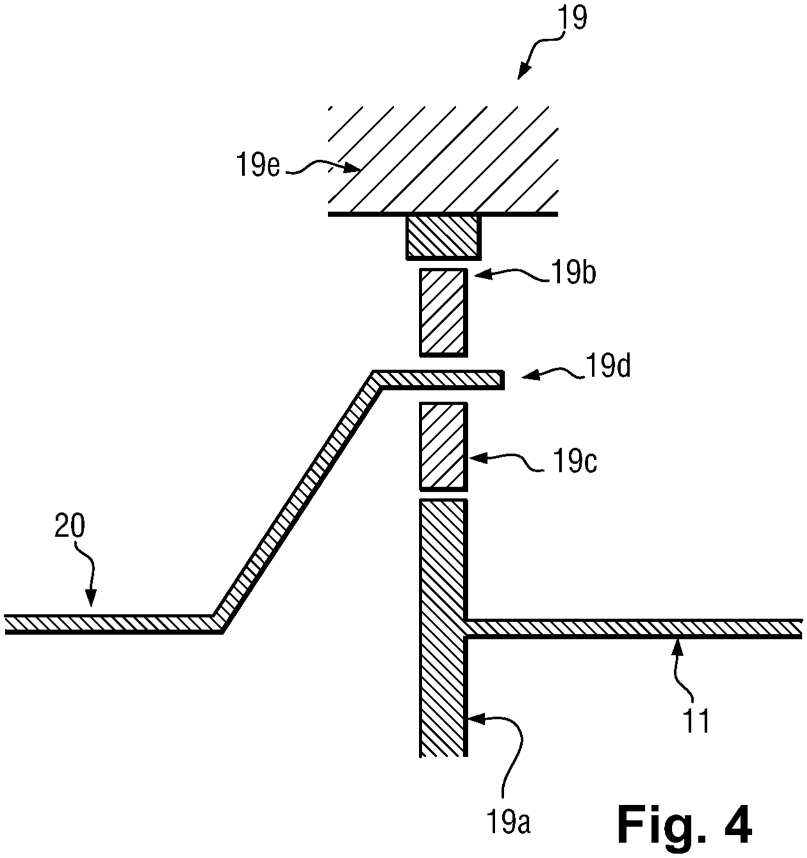
FIG. 4 is a schematic sectional view of one example of an epicyclic reduction mechanism according to a second variant.
Figure 5:
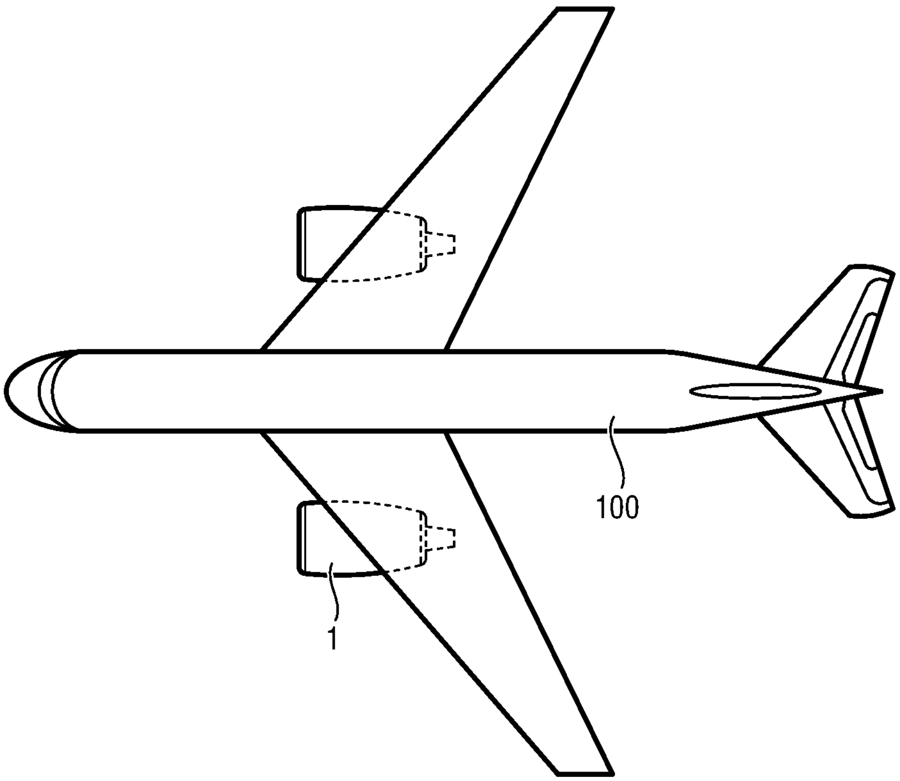
FIG. 5 is one example of an aircraft that can comprise at least one propulsion system in accordance with one embodiment.
Figure 6:
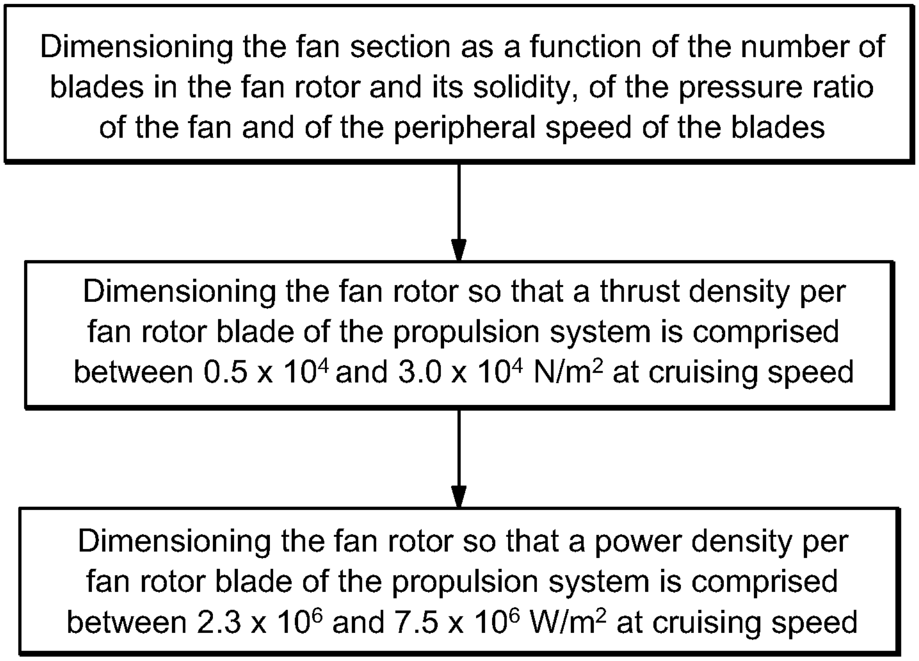
FIG. 6 is a flowchart illustrating examples of steps of a dimensioning or manufacturing method in accordance with one embodiment.

The reduction mechanism 19 can comprise a reduction mechanism 19 with an epicyclic gear train, for example of the "epicyclic" or "planetary" type according to the terminology sometimes encountered by those skilled in the art, single-staged or two-staged. According to a first variant, the reduction mechanism 19 can be of the planetary (star) type (FIG. 3) and comprise a sun pinion 19*a* (inlet of the reduction mechanism 19), centered on an axis of rotation X of the reduction mechanism 19 (generally coincident with the longitudinal axis X) and configured to be driven in rotation by the low-pressure shaft 11, a ring gear 19*b* (outlet of the reduction mechanism 19) coaxial with the sun pinion 19*a* and configured to drive in rotation the fan shaft 20 about the axis of rotation X, and a series of planet gears 19*c* circumferentially distributed about the axis of rotation X between the sun pinion 19*a* and the ring gear 19*b*, each planet gear 19*c* being internally meshed with the sun pinion 19*a* and externally with the ring gear 19*b*. The series of planet gears 19*c* is mounted on a planet gear carrier 19*d* which is fixed relative to a stator portion 19*e* of the propulsion system 1, for example relative to a casing of the compressor section 4, 5. According to a second variant, the reduction mechanism 19 can be of the epicyclic (planetary) type (FIG. 4), in which case the ring gear 19*b* is fixedly mounted on the stator portion 19*e* of the propulsion system 1 and the fan shaft 20 is driven in rotation by the planet gear carrier 19*d* (which is therefore movable in rotation relative to a stator portion 19*e* of the propulsion system 1, for example relative to a casing of the compressor section 4, 5).

Whatever the configuration of the reduction mechanism 19, the diameter of the ring gear 19*b* and of the planet gear carrier 19*d* are greater than the diameter of the sun pinion 19*a*, so that the rotational speed of the fan rotor 9 is lower than the rotational speed of the low-pressure shaft 11.

The reduction ratio of the reduction mechanism 19 is greater than or equal to 2.5 and less than or equal to 11, for example greater than or equal to 2.7 and less than or equal to 6.0, for example around 3.0.

The double-spool propulsion system 1 can in particular comprise a two-stage high-pressure turbine 7, a high-pressure compressor 5 comprising at least eight stages and at most eleven stages, a low-pressure turbine 8 comprising at least three stages and at most five stages and a low-pressure compressor 4 comprising at least two stages and at most four stages.

The speed limit (redline speed) of the low-pressure shaft 11, which corresponds to the absolute maximum speed likely to be encountered by the low-pressure shaft 11 during the entire flight (according to the EASA European certification specification CS-E 740 (or according to the American certification specification 14-CFR Part 33.87)), is comprised between 8,500 revolutions per minute and 12,000 revolutions per minute, for example between 9,000 revolutions per minute and 11,000 revolutions per minute, when the propulsion system 1 is stationary, uninstalled, in take-off rating in a standard atmosphere (as defined by the International Civil Aviation Organization (ICAO) Manual, Doc 7488/3, $3^{rd}$ edition) and at sea level. The speed limit corresponds to the maximum rotational speed when the propulsion system 1 is sound (and potentially at the end of its service life). It is therefore likely to be reached by the low-pressure shaft 11 in flight condition. This speed limit forms part of the data declared in the engine certificate (type certificate data sheet). Indeed, this rotational speed is generally used as a reference speed for the dimensioning and manufacturing of the propulsion systems 1 and in some certification tests (such as blade loss or rotor integrity tests, typically the certification CS-E-800—collision with a bird and ingestion).

In order to optimize the performance of the propulsion system 1, the fan rotor 9 includes at least seventeen blades 14 and at most twenty blades 14. Moreover, a pressure ratio of the fan section 2 is greater than or equal to 1.05 and less than or equal to 1.5, a solidity of the fan rotor 9 is strictly less than 1.0, where the solidity is equal to a ratio between a chord at the blade tip and an inter-blade pitch 23, and a peripheral speed at the blade tip is greater than or equal to 260 m/s and 400 m/s, for example greater than or equal to 270 m/s and less than or equal to 380 m/s. it is noted that the pressure ratio of the fan section 2 and the peripheral speed are measured here at cruising speed to the extent that this is the flight phase in which the maximum efficiency of the fan rotor 9 is to be obtained.

The solidity is equal to the ratio between the chord at the blade tip $c_1$ and an inter-blade pitch 23. The inter-blade pitch 23 corresponds to the angular distance between the upstream intersection points P of two adjacent blades 14; the inter-blade pitch 23 is therefore equal to the external radius $R_e$ of the fan rotor 9 (half-diameter) multiplied by the angle between a first straight line $D_1$, comprised in a plane normal to the axis X which comes from the upstream intersection point P (see FIGS. 2*a* and 2*b*) of a first blade 14 and intersects the axis X and a second straight line $D_2$, comprised in the plane normal to the axis X which comes from the upstream intersection point P of a second blade 14 immediately adjacent to the first blade 14 and intersects the axis X. The solidity being a ratio of distances, it is measured when the propulsion system 1 is a cold system (under the aforementioned conditions) (see FIG. 2*b*).

The pressure ratio of the fan section 2 corresponds to the ratio between the average pressure at the outlet of the fan stator 17 and the average pressure at the inlet of the fan rotor 9. For example, the pressure ratio is greater than or equal to 1.1 and less than or equal to 1.45. The average pressures are measured here on the flowpath (from the surface that radially delimits inside the flowpath at the inlet of the fan rotor 9 to the fan casing 12.

The selection of a number of fan blades 14 between seventeen and twenty blades 14 makes it possible to obtain an optimized fan section 2 participating in the reduction of the specific consumption and the mass of the propulsion system 1.

In addition, a solidity of the fan rotor 9 strictly less than 1.0 is specifically adapted to a rotor 9 comprising between seventeen and twenty blades 14. Indeed, the chord at the blade tip $c_1$ is then reduced compared to the available space (high inter-blade pitch 23), which makes it possible to reduce the mass of the blade 14 and to modify its frequency placement, because the modification of the chord at the blade tip $c_1$ has a significant impact on the first mode of deformation of the blade 14 (at iso-operating range). Indeed, when the mode of deformation of the blades 14 occurs in a steady state of the fan rotor 9 (in particular, the cruising speed), a solution may consist in increasing the thickness of the blade base in order to improve the margins and move this deformation mode. This increase in the thickness of the blades 14 at the blade base however implies increasing the bulk of the base, which influences the circumferential dimension of the cells that receive the base and therefore the design to manage the mechanical resistance of the disk. The increase in the thickness of the blades 14 is therefore likely to increase the hub-tip ratio of the fan rotor 9. However, the increase in the hub-tip ratio is detrimental to the aerodynamic efficiency of the fan rotor 9. On the contrary, the dimensioning of the fan rotor 9 so that its solidity is less than 1.0 makes it possible to reduce the chord at the blade tip $c_1$ and to move the first mode of deformation of the blades 14 into a non-stabilized operating range or outside the operating range of the fan rotor, without thickening the blades 14. It is therefore not necessary to increase the hub-tip ratio.

On the contrary, the number of blades 14 being comprised between seventeen and twenty blades 14 makes it possible to optimize (and particularly reduce) the centrifugal forces to be supported by the hub 13 of the fan rotor 9, and therefore to reduce its radius $R_i$. The hub-tip ratio of the fan rotor can therefore be reduced while the section of passage of the fan rotor 9 and therefore the aerodynamic performance of the fan rotor 9, increase. For example, the fan rotor 9 can have a hub-tip ratio comprised between 0.22 and 0.32, for example. In the case of a fan rotor 9 with fixed pitch angle, the hub-tip ratio can be comprised between 0.22 and 0.30, for example between 0.235 and 0.27. The hub-tip ratio corresponds to the ratio between the inner radius $R_i$ and the outer radius $R_e$ of the fan rotor 9. The inner radius $R_i$ corresponds to the distance between the axis of rotation X and the intersection point between the leading edge 22 and the surface that delimits radially inside the flowpath at the inlet of the fan rotor 9 (and corresponds to the point of connection of the leading edge 22 with the aerodynamic surface of the platform of the fan rotor 9). The outer radius $R_e$ is equal to half the diameter D of the fan.

In a propulsion system 1 with a reduction mechanism 19, the rotational speed of the fan rotor 9 is reduced, here comprised between 260 m/s and 400 m/s. Its pressure ratio can also be reduced and is here comprised between 1.05 and 1.5, for example between 1.1 and 1.45, so that the speed difference between the outlet of the fan rotor 9 and the inlet of the fan rotor 9 is reduced while optimizing the efficiency of the fan section 2. The flow at the blade tip through the fan rotor 9 is then supersonic. Particularly, a supersonic shock is generated at the level of the fan blades 14. However, this supersonic shock cannot be eliminated, in particular at cruising speed: it must therefore be monitored to prevent it from deteriorating the efficiency of the fan section 2. By dimensioning and manufacturing the fan rotor 9 with seventeen to twenty blades so that its solidity is strictly less than 1.0, the inter-blade pitch 23 and the chord at the blade tip $c_1$ are such that the supersonic shock is stable at cruising speed and moves only in the divergent portion of the inter-blade channel 24. The inter-blade channel 24 corresponds to the passage between two adjacent blades 14 which extends between an inlet plane 25, which is normal to the air stream F entering the fan rotor 9 and passes through the leading edge 14*a* of the first blade 14, and an outlet plane 26 which is parallel to the inlet plane and passes through the trailing edge 14*b* of the second blade 14 (see for example FIG. 2*a*). This channel 24 has, from upstream to downstream through the fan rotor 9, a convergent portion which extends from the inlet plane 25 to an intermediate plane 27 corresponding to the minimum section of the channel 24 (neck), and a divergent portion which extends from the intermediate plane 27 to the outlet plane 26. However, the Applicant has observed that, when the supersonic shock reached the convergent portion of the inter-blade channel 24, it became unstable and had the effect of reducing the efficiency of the fan section 2. Conversely, when the supersonic shock remains in the divergent portion, by being for example in the vicinity of the intermediate plane 27, the supersonic shock is stable at cruising speed. The longer the inter-blade channel 24, that is to say the greater the distance between the inlet 25 and outlet 26 planes, the easier it is to design a convergent-divergent channel and therefore to maintain the supersonic shock in the divergent portion of the channel 24. In addition, the lower the hub-tip ratio, the longer the inter-blade channel 24 without penalizing the chord at the blade tip $c_1$. The decrease in the hub-tip ratio indeed makes it possible to increase the section of passage of the fan rotor 9 and to reduce the axial speed of the air stream F. The blades 14 can therefore have a more open pitch angle (so that the chord at the blade base $c_2$ is closer to the air stream F entering the fan rotor 9), which lengthens the inter-blade channel 24 and therefore makes it possible to better manage the supersonic shock, knowing that the pitch angle of a blade 1 is considered "open" when the orientation of the chord is closer to that of the axis than for a "closed" pitch angle. Thus, the selection of a solidity less than 1.0 combined with a number of blades 14 comprised between seventeen and twenty makes it possible to monitor the supersonic shock in the fan rotor 9, thanks to a length of the adapted inter-blade channel 24, and to obtain an efficient fan section 2.

In one embodiment, the solidity of the fan rotor remains greater than 0.6 in order to be able to sufficiently open the pitch angle of the blades 14 and to guarantee that the chord at the blade tip $c_1$ remains sufficiently long to ensure the presence of a sufficiently long inter-blade channel 24 and monitor the supersonic shock.

The diameter D of the fan rotor can then be comprised between 80 inches (203.2 cm) and 185 inches (469.9 cm) inclusive. The diameter D is for example comprised between 85 inches (215.9 cm) and 120 inches (304.8 cm) inclusive, for example of the order of 90 inches (228.6 cm), which allows the integration of the propulsion system 1 in a conventional manner, particularly under the wing of an aircraft 100. The diameter of the fan rotor 9 is measured here in a plane normal to the axis of rotation X at the level of the upstream intersection point P (between the top 21 and the leading edge 14*a* of the blades 14 of the fan rotor 9) and is expressed in meters (m). It is noted that FIG. 1 being a partial view, the diameter D is only partially visible.

The number of vanes 16 in the fan stator 17 depends on the acoustic criteria defined for the propulsion system 1 and is at least equal to the number of blades 14 of the fan rotor 9. In one embodiment, the number of vanes 16 in the fan stator 17 is at least equal to 38 and at most equal to 48, for example exactly equal to 40.

$$\text{Thrust density} = \frac{FN}{n * D^2} * 100$$

However, the decrease in the hub-tip ratio of the fan rotor 9 implies an increase in the mechanical load of the hub 13 of the fan rotor 9. The dimensioning and manufacturing of the fan rotor 9 so that its hub-tip ratio is comprised between 0.22 and 0.32 particularly makes it possible to obtain an optimized thrust density per fan blade 14. Particularly, the thrust density per fan rotor 9 blade 14 may be greater than or equal to $0.5\times10^4$ and less than or equal to $3.0\times10^4$ N/m$^2$ where the thrust density per blade 14 is defined by the following formula:

$$\text{Thrust density} = \frac{FN}{n * D^2} * 100$$

$$\text{Thrust density} = \frac{FN}{n * D^2} * 100$$

and where: FN is the thrust generated by the propulsion system 1 and is expressed in Newton (N) and is measured when the propulsion system 1 is at cruising speed (10,668 m altitude, 0.8 Mach and in ISA conditions);

n is the number of blades 14 in the fan rotor 9 and is at least equal to seventeen blades 14 and at most equal to twenty blades 14; and D is the diameter of the fan rotor 9.

The Applicant noticed the fact that, when the thrust density per blade at cruising speed is less than $0.5\times10^4$, it is difficult to integrate the propulsion system 1 because it is too bulky, has a too significant mass and generates excessive drag. Moreover, when the thrust density is greater than $3.0\times10^4$ N/m$^2$, the performance of the propulsion system 1 in terms of specific consumption is degraded. The dimensioning and manufacturing of the propulsion system 1, so that the thrust density per blade 14 of the fan rotor 9 is comprised between $0.5\times10^4$ and $3.0\times10^4$ N/m$^2$ at cruising speed, therefore makes it possible to obtain a compromise between the integration and the performance of the propulsion system 1 when the propulsion system 1 comprises a reduction mechanism 19 and has a high bypass ratio. Such an interval of thrust density per blade 14 is further compatible with a fan pressure ratio of less than 1.45, which makes it possible to optimize the propulsive efficiency of the propulsion system 1.

By way of example, a propulsion system 1 according to the present disclosure comprising a ducted fan rotor and whose thrust density per fan blade 14 is equal to $1.6\times10^4$ N/m$^2$ at cruising speed has a lower specific consumption of 15% compared to the same propulsion system whose thrust density per fan blade is equal to $4\times10^4$ N/m$^2$. The thrust density per propulsion system 1 blade is influenced to the first order by the diameter D of the fan rotor and the pressure ratio of the fan section 2. The bypass ratio, the overall compression ratio and the number of stages in the compression and turbine sections generally have no or little impact on the thrust density per blade 14.

Comparative Example

The engine 1 is a two-spool propulsion system comprising a ducted fan section corresponding to the current technical standard (at the filing date of the present application) to be improved.

The engine 2 is a two-spool propulsion system 1 comprising a ducted fan section in accordance with the teaching of the present application.

| Dimensioning parameter (SLS unless otherwise indicated) | Engine 1 (reference) | Engine 2 (in accordance with the present disclosure) |
|---|---|---|
| Solidity | 1.1 | 0.9 |
| peripheral speed of the fan blades | 346 m/s | 343 m/s |
| Number of fan blades | 18 | 18 |
| Hub-tip ratio | 0.30 | 0.30 |
| Thrust density per fan blade (cruise) | $1.04 \times 10^6$ | $9.14 \times 10^5$ |
| Pressure ratio of the fan | 1.43 | 1.37 |
| Thrust of the engine (cruising) | 24,250N | 20,451N |
| Diameter D | 2.11 m (83 in.) | 2.413 m (95 in.) |
| bypass ratio BPR | 11.0 | 12.0 |
| Speed limit of the fan rotor 9 (redline) | 3,284 rpm | 2,842 rpm |
| Speed limit of the high-pressure shaft (redline) | 19,888 rpm | 19,741 rpm |
| Speed limit of the low-pressure shaft ($N_1$) (redline) | 8,962 rpm | 10,143 rpm |
| Compression ratio of the low-pressure compressor | 1.85 | 1.85 |
| Overall compression ratio | 42 | 50 |
| Reduction ratio | 2.73 | 3.57 |
| Number of stages of the low-pressure compressor | 2 | 2 |
| Number of stages of the high-pressure compressor | 10 | 10 |

-continued

| Dimensioning parameter (SLS unless otherwise indicated) | Engine 1 (reference) | Engine 2 (in accordance with the present disclosure) |
|---|---|---|
| Number of stages of the high-pressure turbine | 2 | 2 |
| Number of stages of the low-pressure turbine | 4 | 3 |
| Temperature at the inlet of the high-pressure turbine | 1,577° C. | 1,627° C. |
| Temperature at the inlet of low-pressure turbine (redline) | 1,027° C. | 1,024° C. |
| $N_1^2S$ (where S is the outlet section of the low-pressure turbine) | $36.7 \times 10^6$ $(rpm)^2 \cdot m^2$ | $48.6 \times 10^6$ $(rpm)^2 \cdot m^2$ |

The engine 1 has a higher solidity for 18 blades compared to the engine 2. The consequence is that the chord of the fan blades of the engine 2 is reduced over the entire height of the blade compared to the chord of the fan blades of the engine 1, so that the first mode of deformation of the fan blades of the engine 2 is lower than in the engine 1. On the other hand, this reduction in the chord of the fan blades in the engine 2 has the consequence that the mass of the fan and of the fan disk of the engine 2 is smaller than in the reference engine, as is the drag of the nacelle (gain due to the distance from the axial chord). The specific consumption of the engine 2 is therefore smaller than that of the engine 2.

The fan blades of the two engines can in particular be made of a composite material comprising a fibrous reinforcement embedded in a polymer matrix. If necessary, the fibers of the fibrous reinforcement can be hybridized (use of different fibers in the reinforcement in a localized manner) in order to modify the frequency placement of the modes of deformation of the blades.

To move from the engine 1 (reference) to the engine 2 (in accordance with the disclosure), the diameter D of the fan and the bypass ratio BPR were increased, which made it possible to improve the propulsive efficiency and maintain a similar thrust given the drop in the pressure ratio of the fan 2. Moreover, the overall compression ratio was increased, as well as the inlet temperature of the high-pressure turbine 7, which made it possible to increase the thermal efficiency of the propulsion system 1. Finally, to the extent that the temperature of the low-pressure turbine 8 was kept stable, it was possible to increase its mechanical loading ($N_1^2S$) and therefore to reduce the number of stages.

The invention claimed is:

1. A propulsion system comprising:

a drive shaft movable in rotation about an axis of rotation;

a fan shaft;

a fan section comprising a fan rotor driven in rotation by the fan shaft; and a reduction structure coupling the drive shaft and the fan shaft in order to drive the fan shaft at a rotational speed lower than the rotational speed of the drive shaft;

wherein the fan rotor comprises at least seventeen blades and at most twenty blades and has a solidity strictly less than 1.0, where the solidity is equal to a ratio between a chord at the blade tip and an inter-blade pitch at the blade tip, the fan section having a hub-tip ratio greater than or equal to 0.22 and less than or equal to 0.32, a pressure ratio greater than or equal to 1.05 and less than or equal to 1.5 and a peripheral speed at the blade tip greater than or equal to 260 m/s and less than or equal to 400 m/s, the pressure ratio and the peripheral speed being measured at cruising speed, wherein a thrust density corresponding to each fan rotor blade of the fan section is greater than or equal to $0.5\times10^4$ and less than or equal to $3.0\times10^4$ N/m$^2$, where the thrust density per blade is defined by the following formula:

$$\text{Thrust density} = \frac{FN}{n * D^2} * 100$$

where:

FN is a thrust generated by the propulsion system and is measured when the propulsion system is stationary at cruising speed in a standard atmosphere and is expressed in Newton;

n is the number of blades in the fan rotor; and

D is the diameter of the fan rotor, measured in a plane normal to the axis of rotation at an intersection between the top and a leading edge of the fan rotor blades and is expressed in meters, the diameter being greater than or equal to 2.159 m and less than or equal to 3.048 m; and wherein the thrust, the number of blades, and the diameter are selected such that the thrust generated by the propulsion system is comprised between 18,000 lbf and 51,000 lbf when the propulsion system is stationary, uninstalled, in take-off rating in a standard atmosphere.

2. The propulsion system according to claim 1, wherein the solidity of the fan rotor is also strictly greater than 0.6.

3. The propulsion system according to claim 1, wherein the peripheral speed at the tip of the blades is greater than or equal to 270 m/s and less than or equal to 380 m/s.

4. The propulsion system according to claim 1, wherein the hub-tip ratio is greater than or equal to 0.235 and less than or equal to 0.30.

5. The propulsion system according to claim 1 housed in a fan casing, the blades of the fan rotor being fixed in rotation relative to a hub of the fan rotor so as to have a fixed pitch angle.

6. The propulsion system according to claim 1, further comprising a fan stator comprising at least 38 stator vanes and at most 48 stator vanes.

7. The propulsion system according to claim 1, wherein a bypass ratio of the propulsion system is comprised between 10 and 35 inclusive.

8. The propulsion system according to claim 1, wherein a bypass ratio of the propulsion system is comprised between 10 and 18 inclusive.

9. The propulsion system according to claim 1, wherein a drive turbine comprises at least three and at most five stages.

10. The propulsion system according to claim 1, wherein a compressor comprises at least two and at most four stages.

11. The propulsion system according to claim 1, further comprising a high-pressure turbine and a high-pressure compressor connected via a high-pressure shaft, the high-pressure shaft rotating more quickly than the drive shaft, the high-pressure turbine being a two-stage turbine.

12. The propulsion system according to claim 11, wherein the high-pressure compressor comprises at least eight and at most eleven stages.

13. The propulsion system according to claim 1, wherein the fan blades are made of a composite material comprising a fibrous reinforcement embedded in a polymer matrix.

14. An aircraft comprising:

at least one of the propulsion system according to claim 1; and a pylon, wherein the at least one of the propulsion system is fixed to the aircraft via the pylon.

15. A method of operating a fan section of a propulsion system, the fan section comprising a fan rotor comprising at least seventeen blades and at most twenty blades and having a solidity strictly less than 1.0 and optionally strictly greater than 0.6, where the solidity is equal to a ratio between a chord at the blade tip and an inter-blade pitch at the blade tip, the fan section having a hub-tip ratio greater than or equal to 0.22 and less than or equal to 0.32, a pressure ratio greater than or equal to 1.05 and less than or equal to 1.5, and a peripheral speed at the blade tip greater than or equal to 260 m/s and less than or equal to 400 m/s, the pressure ratio and the peripheral speed being measured at cruising speed, wherein a thrust density corresponding to each fan rotor blade of the fan section is greater than or equal to $0.5\times10^4$ and less than or equal to $3.0\times10^4$ N/m$^2$, where the thrust density per blade is defined by the following formula:

$$\text{Thrust density} = \frac{FN}{n * D^2} * 100$$

and where:

FN is a thrust generated by the propulsion system and is measured when the propulsion system is stationary at cruising speed in a standard atmosphere and is expressed in Newton;

n is the number of blades in the fan rotor; and

D is the diameter of the fan rotor, measured in a plane normal to the axis of rotation at an intersection between the top and a leading edge of the fan rotor blades and is expressed in meters, the diameter being greater than or equal to 2.159 m and less than or equal to 3.048 m; and wherein the method comprises:

selecting the thrust, the number of blades, and the diameter such that thrust generated by the propulsion system is comprised between 18,000 lbf and 51,000 lbf when the propulsion system is stationary, uninstalled, in take-off rating in a standard atmosphere, and operating the fan section of the propulsion system.

16. The method according to claim 15, wherein the fan blades are made of a composite material comprising a fibrous reinforcement embedded in a polymer matrix.

* * * * *